United States Patent
Farrugia

(10) Patent No.: US 11,609,103 B2
(45) Date of Patent: Mar. 21, 2023

(54) INDUCTIVE SENSOR DEVICE AND METHOD OF DETECTING MOVEMENT OF AN OBJECT

(71) Applicant: Jaquet Technology Group AG, Pratteln (CH)

(72) Inventor: Andre Farrugia, Pratteln (CH)

(73) Assignee: Jaquet Technology Group AG, Pratteln (CH)

( * ) Notice: Subject to any disclaimer, the term of this patent is extended or adjusted under 35 U.S.C. 154(b) by 111 days.

(21) Appl. No.: 17/157,032

(22) Filed: Jan. 25, 2021

(65) Prior Publication Data

US 2021/0247211 A1      Aug. 12, 2021

(30) Foreign Application Priority Data

Feb. 12, 2020   (EP) ..................................... 20156827

(51) Int. Cl.
  *G01D 5/20*       (2006.01)

(52) U.S. Cl.
  CPC ................... *G01D 5/2006* (2013.01)

(58) Field of Classification Search
  CPC ...... G01D 5/20; G01D 5/2006; G01D 5/2026; G01D 5/22; G01D 5/225; G01D 5/12; G01D 2205/10; G01D 2205/50; G01D 2205/70; G01P 3/50; G01P 3/505; G01P 13/00; G01P 13/0073; G01P 1/026; G01P 3/42; G01P 3/56; G01P 1/10; G01B 7/003
  See application file for complete search history.

(56) References Cited

U.S. PATENT DOCUMENTS

| 3,942,491 A * | 3/1976 | Seite .......................... F02P 5/15 123/406.24 |
| 4,589,278 A | 5/1986 | Ginns |
| 2006/0119350 A1* | 6/2006 | Berchowitz ......... F15B 15/2861 324/207.2 |

FOREIGN PATENT DOCUMENTS

| DE | 102005024046 A1 | 11/2006 |
| EP | 2713137 A1 | 4/2014 |

OTHER PUBLICATIONS

Extended European Search Report, European Application No. 20156827. 6-1010, European Filing Date, dated Jun. 10, 2020.

* cited by examiner

*Primary Examiner* — Son T Le
(74) *Attorney, Agent, or Firm* — Barley Snyder

(57) ABSTRACT

An inductive sensor device for detecting a reciprocating movement of an object includes an oscillator circuit and a processing unit. The oscillator circuit has a sensing coil configured for inducing eddy currents in the object. The processing unit is configured to count a plurality of oscillations of the oscillator circuit detected in a plurality of sampling periods, compare the oscillations with a predetermined mean value of oscillations, and determine both a speed and a position of the object based on a comparison of the oscillations with the predetermined mean value of oscillations.

20 Claims, 6 Drawing Sheets ically moving object, for example, in the context of
INDUCTIVE SENSOR DEVICE AND METHOD OF DETECTING MOVEMENT OF AN OBJECT

CROSS-REFERENCE TO RELATED APPLICATION

This application claims the benefit of the filing date under 35 U.S.C. § 119(a)-(d) of European Patent Application No. 20156827, filed on Feb. 12, 2020.

FIELD OF THE INVENTION

The invention relates to a sensor device and, more particularly, to an inductive sensor device for measuring the speed and position (stroke) of an object moving in a reciprocating linear manner.

BACKGROUND

Accurately detecting the position (stroke) and speed of a linearly moving object, for example, in the context of cylinder-piston systems of combustion engines, is a delicate task in order to control proper operation of a machine, for example, a combustion engine. In the art, optical sensors, magnetic Hall sensors and inductive sensors are known for detecting linear and/or rotational movements of objects. Inductive sensors operating based on Faraday's law provide advantages with respect to the accuracy of position sensing and robustness against harsh environments. Eddy current sensors represent a class of inductive sensors of particular importance.

An eddy current sensor comprises a detector coil connected to a capacitance and an alternating current generator (oscillator) in order to form a tuned frequency oscillator (tank) circuit (providing a sinus wave current signal, for example). The current generator causes a high-frequency alternating electrical current flowing in the detector coil that is associated with a high-frequency time-varying magnetic field (primary magnetic field). This primary magnetic field induces eddy currents in an electrically conductive object to be detected that in course induce a secondary magnetic field that, according to Lenz's law, is directed oppositely to the primary magnetic field. This secondary magnetic field affects the impedance and, thus, the resonance frequency $f_0$ of the oscillator circuit ($f_0 = 1/(2\pi(LC)^{1/2})$, with L and C denoting the inductance and capacitance of the oscillator circuit, respectively. Changes of the impedance/resonance frequency can be detected by a processing unit that may comprise demodulator and amplification units and generates signals based on the changes of the impedance/resonance frequency that can be used to derive information on the position (stroke) and speed of the detected object, in principle.

However, two different sensor devices are conventionally needed for detecting the position (stroke) and speed of a linearly moving object, respectively. Additional markers on the object are needed to obtain reference values for the measurements. Moreover, the real-time torque at a crankshaft of an internal combustion engine cannot be determined with a sufficiently high accuracy in the art. Manufacturing tolerances, in general, also contribute to the difficulties of accurately measuring the movement of an object, for example, the movement of a piston in a cylinder of an internal combustion engine.

SUMMARY

An inductive sensor device for detecting a reciprocating movement of an object includes an oscillator circuit and a processing unit. The oscillator circuit has a sensing coil configured for inducing eddy currents in the object. The processing unit is configured to count a plurality of oscillations of the oscillator circuit detected in a plurality of sampling periods, compare the oscillations with a predetermined mean value of oscillations, and determine both a speed and a position of the object based on a comparison of the oscillations with the predetermined mean value of oscillations.

BRIEF DESCRIPTION OF THE DRAWINGS

The invention will now be described by way of example with reference to the accompanying Figures, of which.

DETAILED DESCRIPTION OF THE EMBODIMENT(S)

Features and exemplary embodiments as well as advantages of the present disclosure will be explained in detail with respect to the drawings. It is understood that the present disclosure should not be construed as being limited by the description of the following embodiments. It should furthermore be understood that some or all of the features described in the following may also be combined in alternative ways.

The present invention provides a sensor device and a method for detecting the movement of a linearly reciprocating object. The stroke and speed of the object can be determined by one single inductive sensor device. In the following detailed description, the object is represented by a piston moving in a cylinder of an internal combustion engine. The invention, however, is not restricted to this particular application.

Figure 1A:
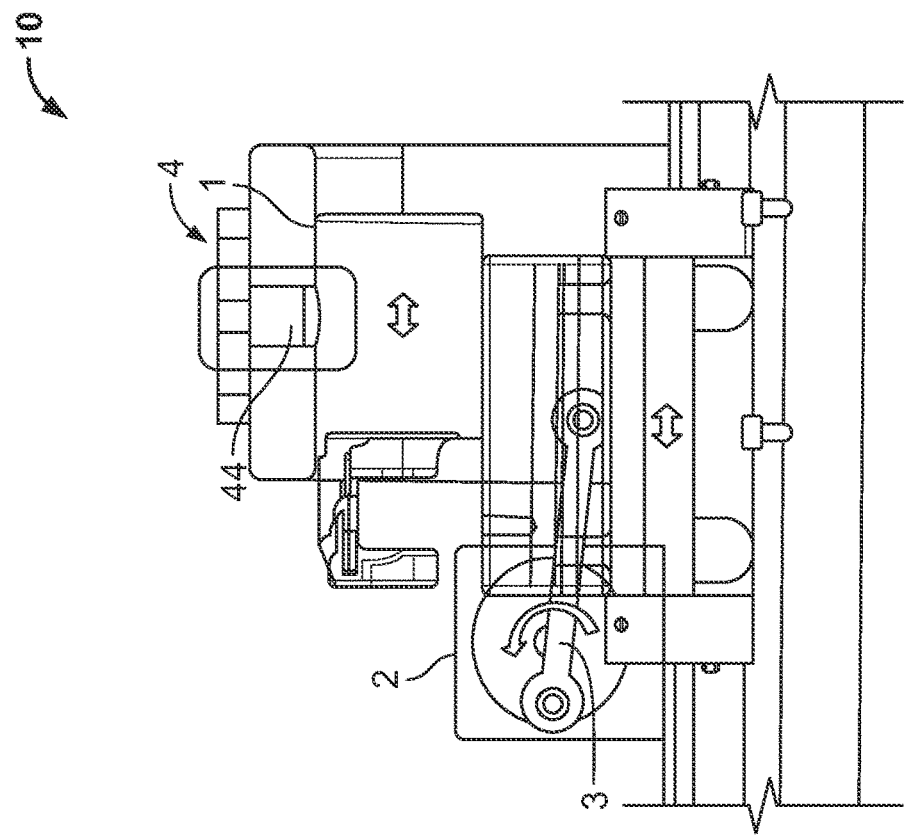
FIG. 1a is a side view of a configuration for detecting the movement of a piston according to an embodiment in a first position.
Figure 1B:
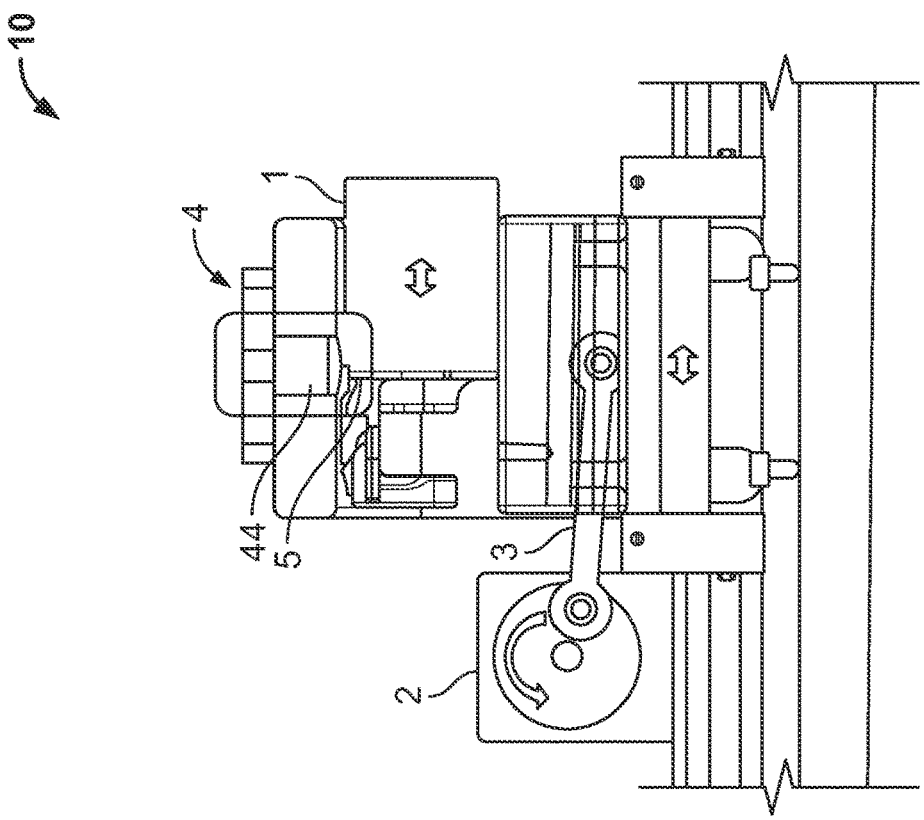
FIG. 1b is a side view of the configuration in a second position.

FIGS. 1a and 1b illustrate a configuration 10 for detecting the movement of a piston 1 according to an embodiment of the present invention. The piston 1 may be made of aluminum, for example, and is moved in a cylinder of an internal combustion engine by a movement generator 2 via a crankshaft 3. The directions of the reciprocating movement of the piston 1 are illustrated by the double arrows. The reciprocating movement of the piston 1 is detected by an inductive sensor device 4 having a sensor tip element 44. In the situation shown in FIG. 1a, the sensor tip element 44 partially faces a piston groove 5 of the piston 1 whereas in the situation shown in FIG. 1b the sensor tip element 44 completely faces the body of the piston 1 within a detection range.

The inductive sensor device 4 includes an oscillator circuit generating an alternating current and a sensing coil positioned in or representing partly the sensor tip element 44. The coil may be a double coil and may have a diameter of about 10 mm, for example. The coil may be made of a highly conductive material, for example, copper, and may be formed on an appropriate support substrate, for example, being made of a polymer material. Moreover, the inductive sensor device 4 comprises a processing unit, for example, a microcontroller. The microcontroller may be an 8 bit microcontroller.

The alternating current generates a primary magnetic field that induces electrical eddy currents in the electrically conductive body of the piston 1. The eddy currents induce a secondary magnetic field affecting the impedance and resonance frequency of the oscillator circuit of the inductive sensor device 4. If only a part of the body of the piston 1 or no part of the body faces the sensor tip element 44, a relatively weak secondary magnetic field or no secondary magnetic field is induced. If the body of the piston 1 completely faces the sensor tip element 44, a relatively strong secondary magnetic field is induced and, thus, a relatively strong change in the impedance and resonance frequency of the oscillator circuit can be observed. This information can be directly translated to information on the stroke and speed of the piston 1 as it is described below.

Figure 2:
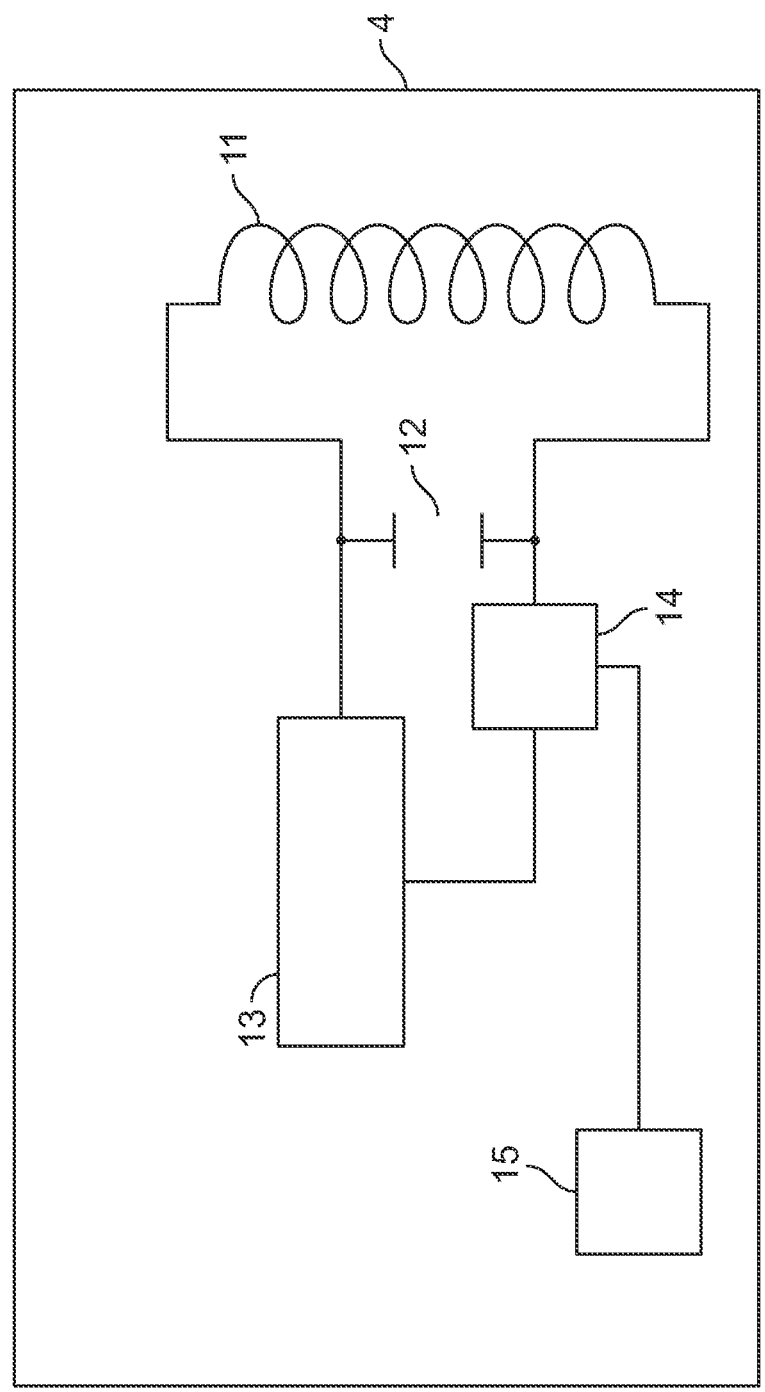
FIG. 2 is a schematic block diagram of components of an inductive sensor device of the configuration.

FIG. 2 very schematically illustrates components of the inductive sensor device 4 shown in FIGS. 1a and 1b. The inductive sensor device 4 includes a sensing coil 11 that is positioned in the sensor tip element 44 shown in FIGS. 1a and 1b. Further, the inductive sensor device 4 has a capacitive device 12. The resonance circuitry is powered by some oscillator, for example, an alternate current generator 13 (in which the capacitive device 12 may be integrated according to another example) generating an alternating electrical current.

As shown in FIG. 2, a sensing device 14 is provided in order to detect changes in the oscillator circuitry (impedance, resonance frequency) due to the presence of an object to be detected in a detection area of the sensing coil 11, i.e., the piston 1 in the example shown in FIGS. 1a and 1b. For example, the sensing device 14 can be configured to measure currents or voltages. The sensing device 14 outputs signals to a processing unit 15. The processing unit 15 may be or comprise a microcontroller. The processing unit 15 processes the signals provided by the sensing device 14 in order to determine both the position and speed of the object that is to be detected.

Figure 3:
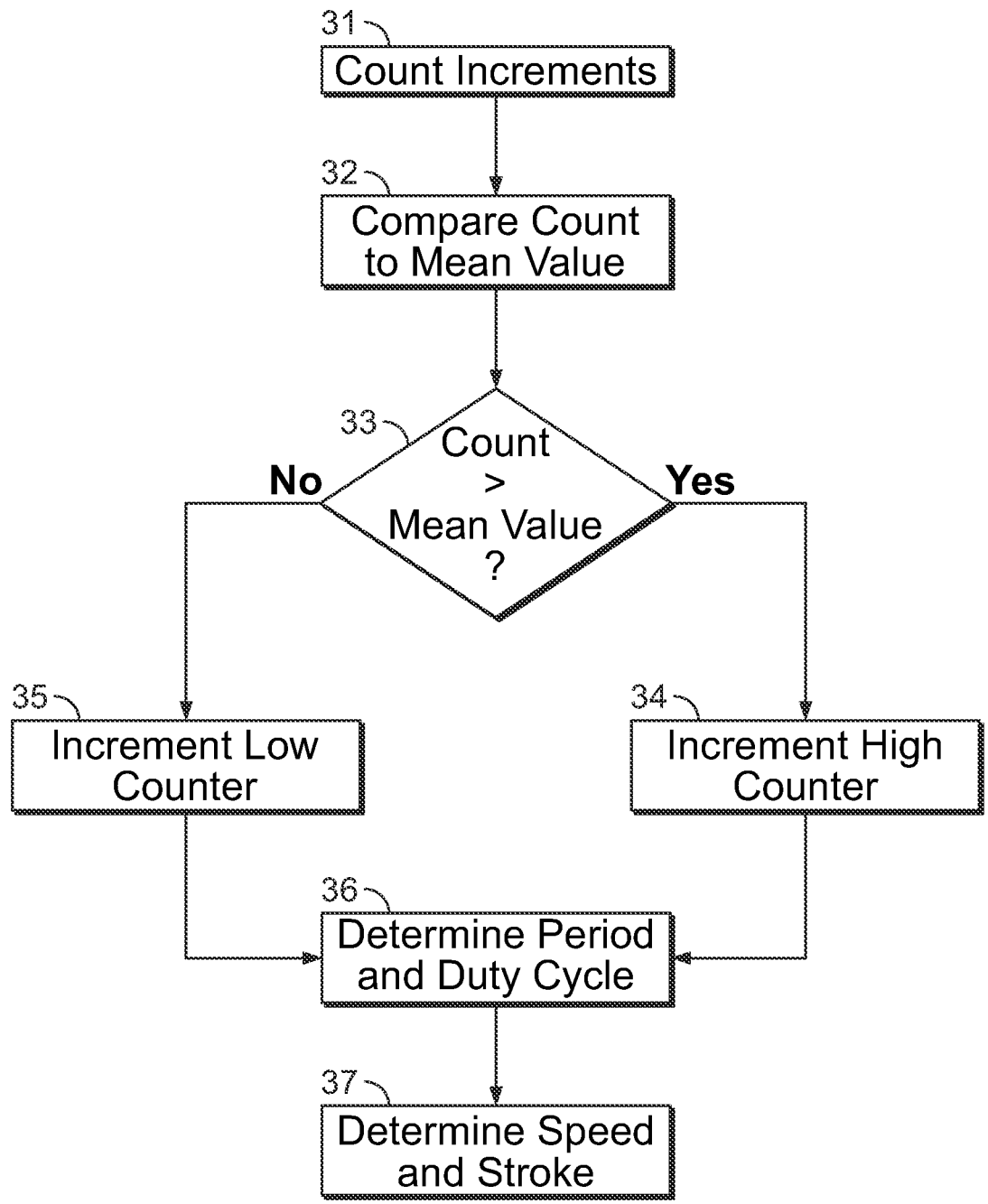
FIG. 3 is a flow chart of an operation of a processing unit of the inductive sensor device according to an embodiment of the present invention.

An operation of the processing unit 15 shown in FIG. 2 according to an embodiment is illustrated in the flow chart of FIG. 3. The oscillator 13 operates at some clock frequency, for example, a clock frequency between 5 to 20 MHz. During a sampling period (timer period) the processing unit 15 counts the number of positive (or, alternatively, negative) edges (one oscillation comprises two edges, namely, a rising/positive and a falling/negative edge) of the signal provided by the sensing device 14, i.e., the resonance frequency of the oscillator circuit as affected (or not, if it is not within the detection range of the sensor coil) by the object to be detected (step 31 of FIG. 3). The oscillatory signal provided by the sensing device 14 may be a voltage or current signal. If, for example, a clock frequency of 10 MHz is provided and 2560 increments are counted for a timer period, a frequency of counts (sampling frequency) of 3906.25 results. This frequency of counts, on the other hand, translates to a timer period of 1/3906.25=256 μs.

The processing unit 15 not only counts the edges of the oscillatory signals but also compares the count for each timer period with a mean value of edges of the oscillatory signals per timer period obtained for a number of previous timer periods (step 32 of FIG. 3). The mean value, according to a particular embodiment, can be determined after low-pass filtering of the counts over timer periods used for determining the mean value. By this kind of signal pre-conditioning, a weighted average over a pre-defined number of previous timer periods is used for the comparison procedure (step 32 of FIG. 3). In particular, signal noise can be removed by the low-pass filtering.

A decision is made whether the count is above the mean value or not (step 33 of FIG. 3). If the count exceeds the mean value a HIGH (time) counter is incremented (step 34 of FIG. 3), if not a LOW (time) counter is incremented (step 35 of FIG. 3). In fact, it can be predefined whether counts that are equal to the mean value contribute to incrementing the HIGH timer of the LOW timer, in principle.

Figure 4A:
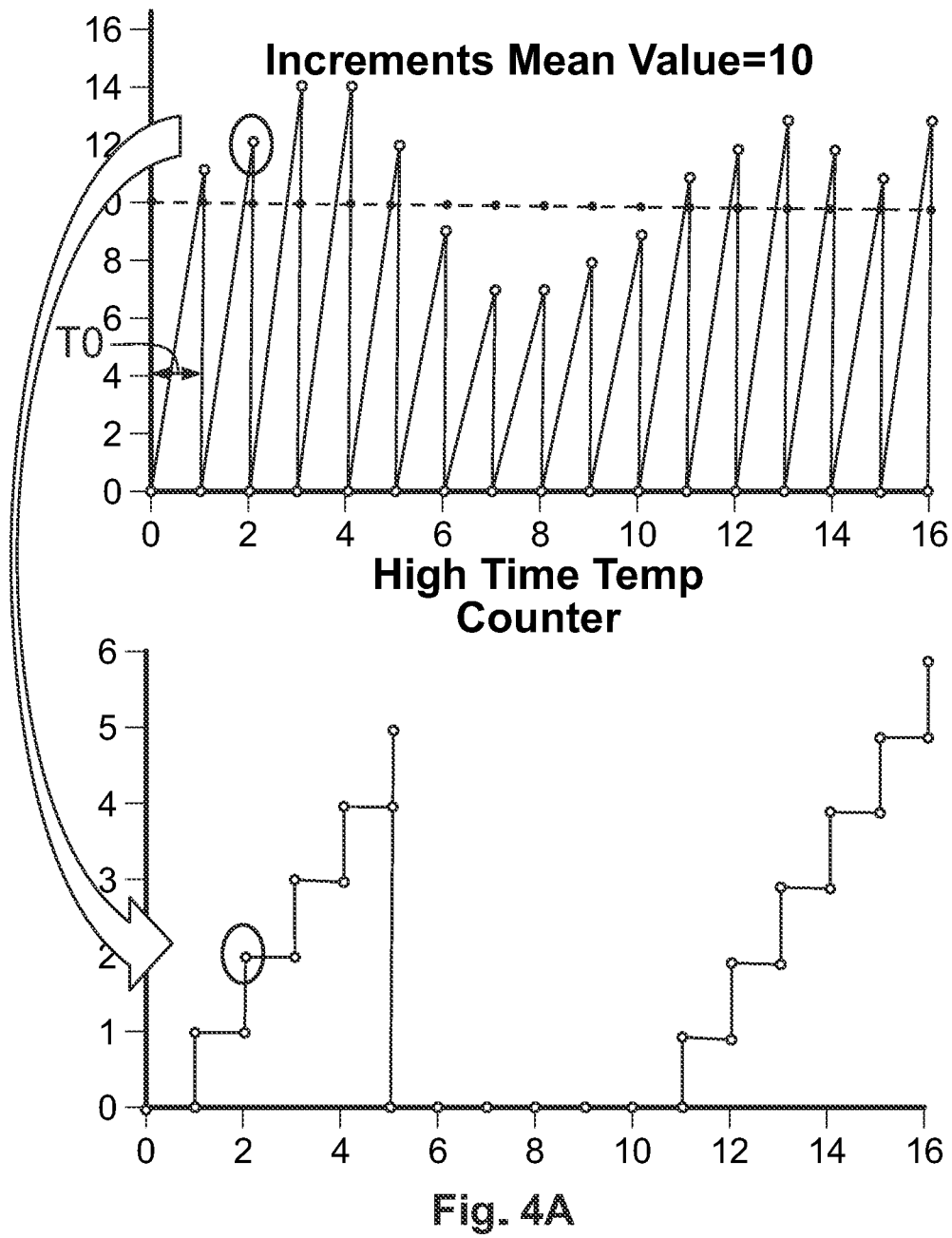
FIG. 4a is a graph of conditional incrementing of a HIGH timer.
Figure 4B:
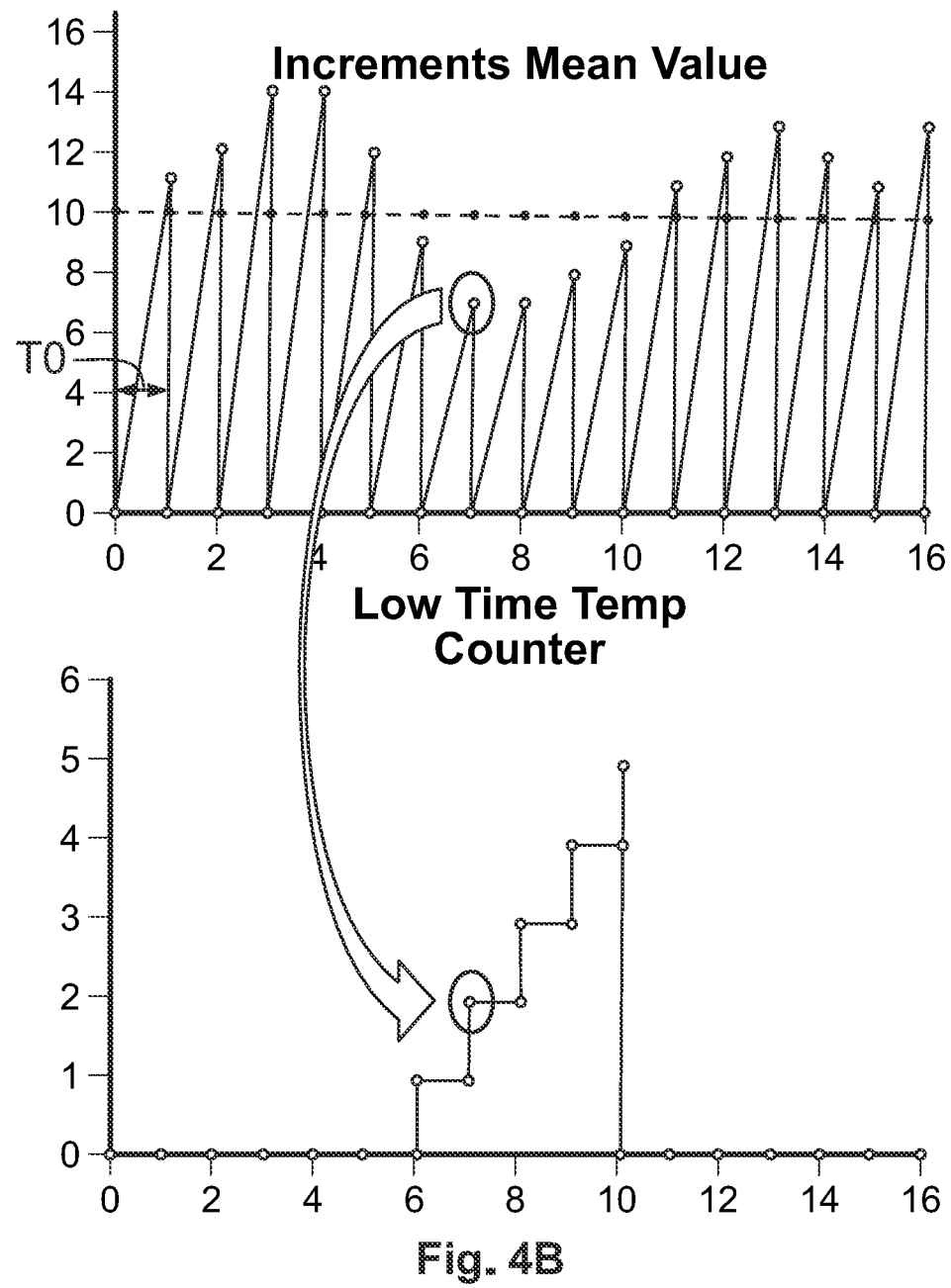
FIG. 4b is a graph of conditional incrementing of a LOW timer.

The steps of incrementing a HIGH timer and a LOW timer are illustrated in FIGS. 4a and 4b. The upper plots of FIGS. 4a and 4b show the counts of increments (in some arbitrary normalization) (ordinate) during each of sixteen timer periods (abscissa), for example. In real applications, step functions for the value of the total counts of positive edges (increments) of the signal provided by the sensing device 14 per timer period might be used. The horizontal line indicates the mean value obtained based on previous timer periods.

As illustrated in the lower plots of FIGS. 4a and 4b, for each timer period that exhibits a count/number of increments above the mean value, the HIGH timer is incremented (counted up by 1) and for each timer period that exhibits a count of increments below the mean value, the LOW timer is incremented (counted up by 1). Clearly periods (time intervals) extending over some timer periods can be identified during which the HIGH timer is incremented (HIGH periods) and other ones during which the LOW timer is incremented (LOW periods), respectively, can be identified.

Based on the thus obtained HIGH and LOW timer counts, the speed and stroke of the piston 1 shown in FIGS. 1a and 1b can be determined as follows. The (cycle) period of movement (presence and absence, respectively) of the (body of the) piston 1 in the detection area of the inductive sensor device 4 of FIGS. 1a and 1b can be determined as the sum of the HIGH timer counts and the LOW timer counts. The duty cycle can be determined as the ratio of the HIGH timer counts and the cycle period, optionally multiplied by some normalization factor for quantization in a desired value, for example, a normalization factor of 100 (step 36 of FIG. 3). The period of the reciprocating movement of the piston 1 extends over three frequency changes of the sensed resonance frequency from frequencies below the mean value to frequencies above the mean value and vice versa.

Based on the obtained cycle period and duty cycle, the speed and stroke of the piston 1 shown in FIGS. 1a and 1b can be determined (step 37 of FIG. 3). The frequency (in Hz) of the movement of the piston 1 is given by the reciprocal value of the period and the speed is given, for example, in rpm by multiplying this frequency by 60. The duty cycle directly translates to a percentage of the entire stroke of the piston 1 within the cylinder. Each concrete piston-cylinder system exhibits its own individual duty cycle range from a duty cycle minimum corresponding to a minimum stroke to a duty cycle maximum corresponding to a maximum stroke that are known beforehand. With this predefined knowledge, the actually determined duty cycles translate to percentages of the entire/maximum stroke.

Consequently, with one single inductive sensor device 4, the speed and stroke of the piston 1 can simultaneously be determined with a high accuracy, and without mechanically contacting the piston 1. From the speed and stroke as well as the known compression of volume caused by the piston 1, the torque of the movement generator 2 shown in FIGS. 1a and 1b can also be directly determined. No reference markers have to be provided for the object to be detected (i.e., piston 1 in the above-described examples). The inductive sensor device 4 can be produced at low costs and is suitable to operate in harsh environments (with temperatures up to some 150° C.).

Figure 5:
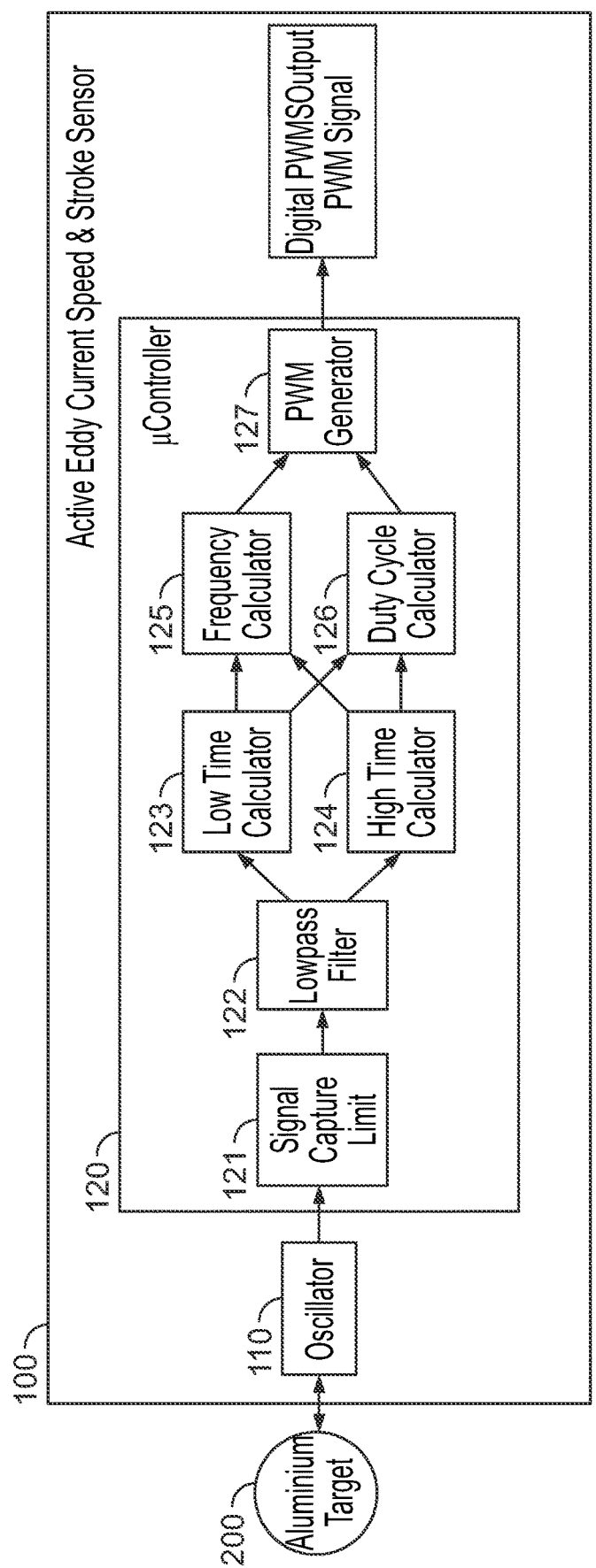
FIG. 5 is a schematic block diagram of an inductive sensor device having a pulse width modulation signal generator for outputting desired signals.

Another example for an inventive inductive sensor device 100 configured to detect movement of an object 200 exhibiting a reciprocating movement is illustrated in FIG. 5. This inductive sensor device 100 can be used in all of the above-described embodiments. The inductive sensor device 100 comprises an oscillator circuit 110 comprising a sensing coil for inducing eddy currents in the object 200 and detecting the presence of the object 200 in the sensor detection range based on the induced secondary magnetic field (confer description above). Moreover, the inductive sensor device 100 includes a processing unit 120, for example, a microcontroller. The processing unit 120 includes a signal capturing device 121 connected to the oscillator circuit 110 receiving oscillatory signals from the same and providing signals representing counts of edges of the oscillatory signals.

The thus provided signals can be low-pass filtered by a low-pass filter 122, shown in FIG. 5. The processing unit 120 may be configured to determine the mean value based on signals that are low-pass filtered by the low-pass filter 122. The employment of the low-pass filter 122 reduces noise and allows for dynamically obtaining a weighted mean value (over past and current counts of oscillations) used for the comparison process.

As shown in FIG. 5, the processing unit 120 includes a LOW timer 123 and a HIGH timer 124 for obtaining HIGH and LOW counts, respectively, as described above. The frequency of the movement of the object 200 can be determined by a frequency calculator 125 and the duty cycle of the object 200 can be determined by a duty cycle calculator 126 in a manner as described above. The processing unit 120 may further comprise a position determining device configured to determine the position of the moving object based on the duty cycle calculated by the duty cycle calculator 126 and a speed determining device configured to determine the speed of the object based on the frequency calculated by the frequency calculator 125.

In addition, the processing unit 120 comprises a pulse width modulation signal generator 127 in order to provide pulse width modulated digital output signals carrying the information on the frequency of the movement and the duty cycle of the object 200. The thus obtained pulse width modulated digital output signals can be used in order to derive the speed of the object 200 and the position (stroke) of the object 200 in a manner as it is described above. The position determining device is configured to determine the position of the object based on first ones (including information on the duty cycle of the movement of the object) of the pulse width modulated signals and the speed determining device is configured to determine the speed of the object based on second ones (including information on the frequency of the movement of the object) of the pulse width modulated signals. The pulse width modulated digital output signals PWMS are particularly suitable for an accurate determination of the speed and stroke. The speed of the object 200 can be determined based on the pulse width modulated digital output signals PWMS and the position (stroke) of the moving object 200 can be determined based on the pulse width modulated digital output signals PWMS.

A method of sensing a reciprocating movement of an object (for example, the piston 1 moving in a cylinder of an internal combustion engine) with the inductive sensor device 4 comprises:

detecting and counting oscillations of the oscillator circuit in sampling periods;

comparing the counted oscillations with a predetermined mean value of oscillations; and determining both the speed and position of the object 1 based on the comparison of the counted oscillations with the predetermined mean value of oscillations.

The method may comprise determining the predetermined mean value by determining the mean value of low-pass filtered signals representing counts of the oscillations.

According to an embodiment, the method of sensing a reciprocating movement of an object 1 comprises the steps of:

determining a HIGH time period by determining a time interval in that the number of counts per sampling period exceeds the mean value or is at least equal to the mean value;

determining a LOW time period by determining a time interval in that the number of counts per sampling period does not exceed the mean value or is below the mean value;

determining a period of the movement of the object 1 by summing up the HIGH time period and the LOW time period; and determining a duty cycle of the movement of the object 1 based on the ratio of the HIGH time period and the sum of the HIGH time period and LOW time period.

Further, the frequency and speed of the object 1 can be determined based on the period of the movement of the object 1 and the position (stroke) of the object 1 can be determined based on the duty cycle of the movement of the object 1.

Each concrete configuration under consideration that comprises a moving object to be detected, for example, a piston 1 moving in a cylinder of a combustion engine, exhibits its own individual duty cycle range from a duty cycle minimum corresponding to a minimum stroke to a duty cycle maximum corresponding to a maximum stroke that are known beforehand. With this predefined knowledge the actually determined duty cycles translate to percentages of the entire/maximum stroke.

The above-described embodiments of the inventive method can be implemented in the above-described embodiments of the inventive inductive sensor device and the above-described embodiments of the inventive inductive sensor device can be configured to perform the steps of the above-described embodiments of the inventive method.

The inventive method may further comprise inducing electrical eddy currents in the object 1 by a sensing coil comprised in the inductive sensor device 4 when the object is in a detection range of the sensing coil. The eddy currents are induced by primary magnetic field generated by the sensing coil when the oscillator circuit is empowered by an electrical generator, for example, an alternating current generator. The eddy currents induce a secondary magnetic field affecting the impedance and resonance frequency of the oscillator circuit and, thus, the number of counts of oscillations.

In an embodiment, a computer program product comprising one or more non-transitory computer readable media has computer-executable instructions for performing the steps of the method according to one of the above-described embodiments when run on a processing unit, in particular, a processing unit 120 of an inductive sensor device 100.

What is claimed is:

1. An inductive sensor device for detecting a reciprocating movement of an object, comprising:
   an oscillator circuit including a sensing coil configured for inducing eddy currents in the object; and
   a processing unit configured to count a plurality of oscillations of the oscillator circuit detected in a plurality of sampling periods, compare the oscillations with a predetermined mean value of oscillations, and determine both a speed and a position of the object based on a comparison of the oscillations with the predetermined mean value of oscillations.

2. The inductive sensor device of claim 1, further comprising a low-pass filter, the processing unit is configured to determine the predetermined mean value of oscillations based on a plurality of signals that are low-pass filtered by the low-pass filter.

3. The inductive sensor device of claim 1, wherein the processing unit includes a HIGH time counter configured to be incremented for each sampling period of the sampling periods in which a number of the counted oscillations exceeds the predetermined mean value of oscillations.

4. The inductive sensor device of claim 3, wherein the processing unit includes a LOW time counter configured to be incremented for each sampling period of the sampling periods in which the number of the counted oscillations is below the predetermined mean value of oscillations.

5. The inductive sensor device of claim 4, wherein, for each sampling period of the sampling periods in which the number of the counted oscillations is equal to the predetermined mean value of oscillations, the processing unit increments either the HIGH time counter or the LOW time counter.

6. The inductive sensor device of claim 5, wherein the processing unit includes a frequency calculator configured to calculate a frequency of the reciprocating movement of the object based on the HIGH time counter and the LOW time counter.

7. The inductive sensor device of claim 6, wherein the processing unit includes a duty cycle calculator configured to calculate a duty cycle of the object based on the HIGH time counter and the LOW time counter.

8. The inductive sensor device of claim 7, wherein the processing unit includes a position determining device configured to determine the position of the object based on the duty cycle.

9. The inductive sensor device of claim 8, wherein the processing unit includes a speed determining device configured to determine the speed of the object based on the frequency.

10. The inductive sensor device of claim 9, further comprising a pulse width modulation signal generator configured to generate a plurality of pulse width modulated signals based on signals output by the duty cycle calculator and the speed calculator.

11. The inductive sensor device of claim 10, wherein the position determining device is configured to determine the position of the object based on a plurality of first pulse width modulated signals and the speed determining device is configured to determine the speed of the object based on a plurality of second pulse width modulated signals.

12. A method of sensing a reciprocating movement of an object with an inductive sensor device including an oscillator circuit, comprising:
   detecting and counting a plurality of oscillations of the oscillator circuit in a plurality of sampling periods;
   comparing the oscillations with a predetermined mean value of oscillations; and
   determining both a speed and a position of the object based on the comparison of the oscillations with the predetermined mean value of oscillations.

13. The method of claim 12, further comprising low-pass filtering the oscillations and determining a predetermined mean value of the low-pass filtered oscillations as the predetermined mean value of oscillations.

14. The method of claim 12, further comprising:
   determining a HIGH time period by determining a time interval in which a number of counts per sampling period exceeds the predetermined mean value of oscillations or is at least equal to the predetermined mean value of oscillations;
   determining a LOW time period by determining a time interval in which the number of counts per sampling period does not exceed the predetermined mean value of oscillations or is below the predetermined mean value of oscillations;
   determining a period of movement of the object by summing the HIGH time period and the LOW time period; and
   determining a duty cycle of the movement of the object based on a ratio of the HIGH time period and the sum of the HIGH time period and the LOW time period.

15. The method of claim 14, wherein the speed of the object is determined based on the period of the movement of the object and the position of the object is determined based on the duty cycle of the movement of the object.

16. The method of claim 15, further comprising pulse width modulating signals including the period of movement of the object and pulse width modulating signals including the duty cycle of the movement of the object, the speed and the position of the object are determined based on the pulse width modulated signals.

17. The method of claim 12, wherein the reciprocating movement of the object is a movement of a piston in a cylinder of a combustion engine and the position is a stroke of the piston.

18. The method of claim 17, wherein the stroke of the piston is determined as a percentage of an entire or maximum stroke known from a predetermined duty cycle minimum corresponding to a minimum stroke and a predetermined duty cycle maximum corresponding to a maximum stroke.

19. The method of claim 12, further comprising inducing a plurality of electrical eddy currents in the object with a sensing coil in the inductive sensor device.

20. A computer program product stored on a non-transitory computer readable medium as a plurality of instructions executable by a processing unit of an inductive sensor device to perform the steps of:
   detecting and counting a plurality of oscillations of an oscillator circuit of the inductive sensor device in a plurality of sampling periods;
   comparing the oscillations with a predetermined mean value of oscillations; and
   determining both a speed and a position of an object moving in a reciprocating movement based on the comparison of the oscillations with the predetermined mean value of oscillations.

* * * * *